US011985992B2

(12) United States Patent
Kang

(10) Patent No.: US 11,985,992 B2
(45) Date of Patent: May 21, 2024

(54) VEGETARIAN KIMCHI AND METHOD OF PREPARING THE SAME

(71) Applicant: LUCID KITCHEN CO., LTD., Gyeongsangbuk-do (KR)

(72) Inventor: Jee Young Kang, Seoul (KR)

(73) Assignee: LUCID KITCHEN CO., LTD., Seongju-Gun (KR)

( * ) Notice: Subject to any disclaimer, the term of this patent is extended or adjusted under 35 U.S.C. 154(b) by 0 days.

(21) Appl. No.: 17/467,541

(22) Filed: Sep. 7, 2021

(65) Prior Publication Data

US 2022/0400720 A1    Dec. 22, 2022

(30) Foreign Application Priority Data

Jun. 17, 2021   (KR) .......................... 10-2021-0078750

(51) Int. Cl.
| | |
|---|---|
| *A23L 19/20* | (2016.01) |
| *A23B 7/10* | (2006.01) |
| *A23B 7/157* | (2006.01) |
| *A23L 19/00* | (2016.01) |
| *A23L 27/10* | (2016.01) |

(52) U.S. Cl.
CPC .............. *A23L 19/20* (2016.08); *A23B 7/105* (2013.01); *A23B 7/157* (2013.01); *A23L 19/03* (2016.08); *A23L 27/105* (2016.08)

(58) Field of Classification Search
CPC ......... A23L 19/20; A23L 5/276; A23L 27/105
See application file for complete search history.

(56) References Cited

U.S. PATENT DOCUMENTS

2010/0015283 A1*   1/2010   Jung ....................... A23B 7/10
426/62

FOREIGN PATENT DOCUMENTS

| JP | H09308464 A | * | 12/1997 | ............... A23B 4/02 |
| JP | 2015015911 A | * | 1/2015 | |
| KR | 200424959 Y1 | * | 6/2006 | ............... A23B 7/10 |
| KR | 20080015178 A | * | 2/2008 | ........... A23L 27/105 |
| KR | 2018032390 A | * | 3/2018 | ............. A23B 7/105 |
| KR | 101937621 B1 | * | 1/2019 | ............. A23L 17/60 |
| KR | 102031081 B1 | * | 10/2019 | ............. A23B 7/105 |
| KR | 102121608 B1 | * | 11/2019 | ............. A23B 7/105 |
| KR | 20200019314 A | * | 2/2020 | ............. A23L 17/50 |

OTHER PUBLICATIONS

Bianca, "Vegan Kimchi Recipe (Easy & Homemade)", [Online], published Jul. 29, 2020, [retrieved on Jan. 30, 2023]. Retrieved from the Internet: <URL: https://biancazapatka.com/en/vegan-kimchi-recipe/> (Year: 2020).*
Park, "Kimchi", in "Handbook of Food and Beverage Fermentation Technology", edited by Hui, 2004, published by Marcel Dekker Inc., pp. 6-40 (Year: 2004).*
Medina "Safety of Fermented Fruits and Vegetables", in "Regulating Safety of Traditional and Ethnic Foods", Edited by Prakash, 2016, pp. 355-366, published by Elsevier (Year: 2016).*

(Continued)

*Primary Examiner* — Changqing Li
(74) *Attorney, Agent, or Firm* — Bridgeway IP Law Group, PLLC; Sang Ho Lee; Hyun Woo Shin

(57) ABSTRACT

Provided is vegetarian kimchi including 1 to 4 weight % sweet pumpkin and 0.1 to 0.5 weight % red *ginseng* extract.

2 Claims, 3 Drawing Sheets

(56) References Cited

OTHER PUBLICATIONS

Modeon Dahae, Installation Photo [Online], published Sep. 16, 2017, [retrieved on Aug. 17, 2022]. Retrieved from the Internet: <URL: http://www.mddh.co.kr/bbs/board.php?bo_table=installation_eng&wr_id=11&ckattempt=1> (Year: 2017).*

Unknown author, Farm food safety: choosing a sanitizer for washing fresh produce [Online], published May 19, 2021, [retrieved on Jun. 12, 2023]. Retrieved from the Internet: <URL: https://hgic.clemson.edu/factsheet/farm-food-safety-choosing-a-sanitizer-for-washing-fresh-produce/> (Year: 2021).*

* cited by examiner

VEGETARIAN KIMCHI AND METHOD OF PREPARING THE SAME

CROSS-REFERENCE TO RELATED APPLICATION

This application claims priority to and the benefit of Korean Patent Application No. 10-2021-0078750, filed on Jun. 17, 2021, the disclosure of which is incorporated herein by reference in its entirety.

BACKGROUND

1. Field of the Invention

The present invention relates to vegetarian kimchi and a method of preparing the same.

2. Discussion of Related Art

Kimchi is a fermented food made by applying seasoning such as red pepper powder, salted seafood, garlic, ginger, green onions, and the like to main ingredients such as napa cabbages, radishes, and the like. Kimchi is a widely used food because it allows people to have fresh vegetables even in winter, prevents adult diseases because it is rich in lactic acid bacteria and various vitamins and minerals, and has a unique taste and flavor.

Kimchi represents Korean indigenous traditional food and is widely known internationally because of its unique effects, and thus the number of people who eat kimchi is increasing.

Recently, with the popularity of kimchi products, various kimchi products are being released. Among many kimchi products, baek-kimchi is kimchi made to be white without red pepper powder, but there are restrictions on ingredients such as not using red pepper powder in order to make the brine clear.

Accordingly, the inventor of the present invention has completed the present invention after long research and trial and error for vegetarian kimchi that does not use red pepper powder and has a new color and a method of preparing the same.

SUMMARY OF THE INVENTION

The present invention is directed to providing a technique for preparing vegetarian kimchi that does not use red pepper powder.

The present invention is also directed to providing a technique for preparing vegetarian kimchi having a yellow color.

Meanwhile, other objects not specified in the present invention will be additionally considered within the range that can be easily inferred from the following detailed description and effects thereof.

According to an aspect of the present invention, there is provided vegetarian kimchi including 1 to 4 weight % sweet pumpkin and 0.1 to 0.5 weight % red *ginseng* extract. The vegetarian kimchi may further include 70 to 76 weight % napa cabbage, 9 to 11 weight % onion, 3 to 6 weight % radish, 1 to 3 weight % garlic, 0.5 to 1.5 weight % glutinous rice paste, 0.5 to 1.5 weight % leek, 0.1 to 1 weight % sugar, and 0.1 to 1 weight % ginger.

According to another aspect of the present invention, there is provided a method of preparing vegetarian kimchi, wherein the vegetarian kimchi includes 1 to 4 weight % sweet pumpkin and 00.1 to 0.5 weight % red *ginseng* extract. The method includes cutting and washing napa cabbage, pickling the napa cabbage using common salt, washing the pickled napa cabbage, dehydrating the washed napa cabbage, preparing seasoning including sweet pumpkin, red *ginseng* extract, onion, radish, garlic, glutinous rice paste, leek, sugar, and ginger, and combining the dehydrated napa cabbage and the seasoning.

The method may further include, after the combining of the dehydrated napa cabbage and the seasoning is performed, aging and storing the vegetarian kimchi at −2° C.

In the pickling of the napa cabbage, the common salt corresponding to 3.5 to 6.0% of an amount of napa cabbage may be introduced. The pickling of the napa cabbage may be performed for four to seven hours. In the washing of the pickled napa cabbage, the amount of the introduced napa cabbage may be 50 kg/min or less, an amount of washing water may be 50 L/min or more, a washing time may be one to two minutes, and the washing water may be replaced every three hours.

The method may further include, after the cutting of the napa cabbage and the washing of the napa cabbage are performed, disinfecting the napa cabbage with chlorine disinfectant, wherein a chlorine concentration of the chlorine disinfectant ranges from 50 to 100 ppm.

The preparing of the seasoning may include preparing agricultural products including the garlic, the ginger, the onion, the radish, and the leek, disinfecting the garlic and the ginger, washing the agricultural products, cutting and grinding the agricultural products, and mixing the sweet pumpkin, the red *ginseng* extract, the agricultural products, and the glutinous rice paste.

The chlorine concentration of the chlorine disinfectant used in the disinfecting of the garlic and the ginger may be 200 ppm. In the washing of the agricultural products, an input amount of the agricultural products, that is, an input amount of the garlic, the ginger, the onion, and the radish may be 20 kg/min or less and an input amount of the leek may be 3 kg/min or less, an amount of washing water may be 15 L/min or more, a washing time may be one minute or more, and the washing water may be replaced every time an ingredient of the agricultural products is changed.

The method may further include, after the combining of the dehydrated napa cabbage and the seasoning is performed, detecting a metal in the vegetarian kimchi.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

Figure 1:
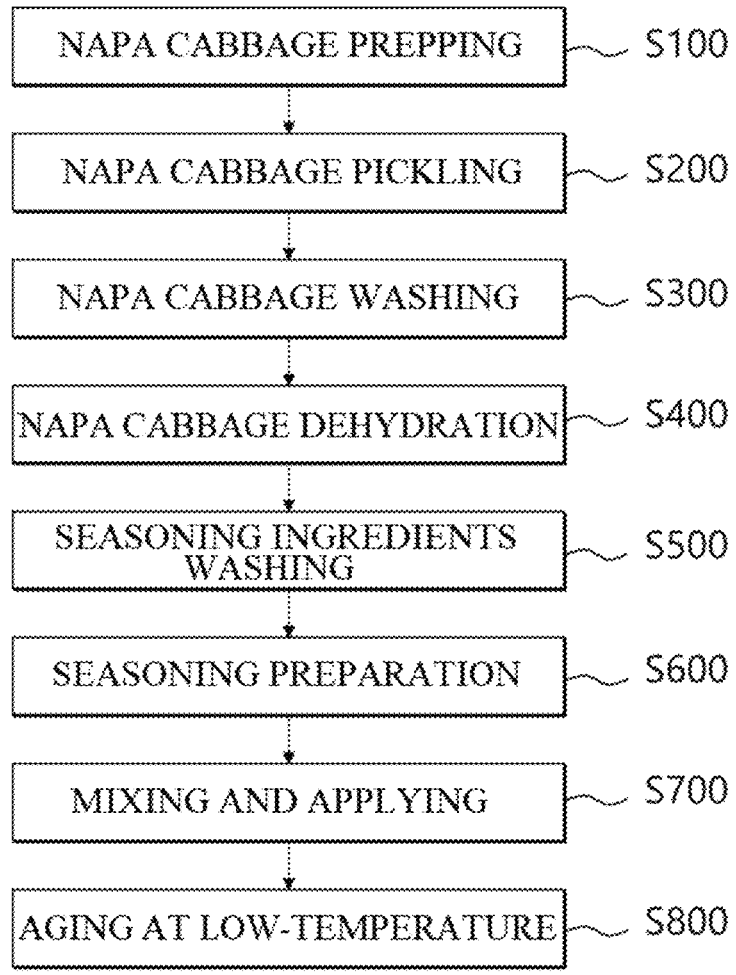
FIGS. 1 and 2 are diagrams illustrating a method of preparing vegetarian kimchi according to an embodiment of the present invention.

It is revealed that the accompanying drawings are exemplified as a reference for understanding the technical idea of the present invention, and the scope of the present invention is not limited thereby.

DETAILED DESCRIPTION OF EXEMPLARY EMBODIMENTS

When embodiments of the present invention are described, when it is determined that the detailed descriptions of known technology related to the present invention unnecessarily obscure the subject matter of the invention, the detailed descriptions will be omitted.

The terminology used herein is for the purpose of describing particular embodiments only and is not intended to be limiting to the present invention. As used herein, the singular forms "a" and "an" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof but do not preclude the presence or addition of one or more other features, integers, steps, operations, elements, parts, or combinations thereof.

Hereinafter, embodiments of vegetarian kimchi and a method of preparing the same according to the present invention will be described in detail with reference to the accompanying drawings. In the description with reference to the accompanying drawings, the same or corresponding components are given the same reference numerals and descriptions thereof will not be repeated.

Figure 2:
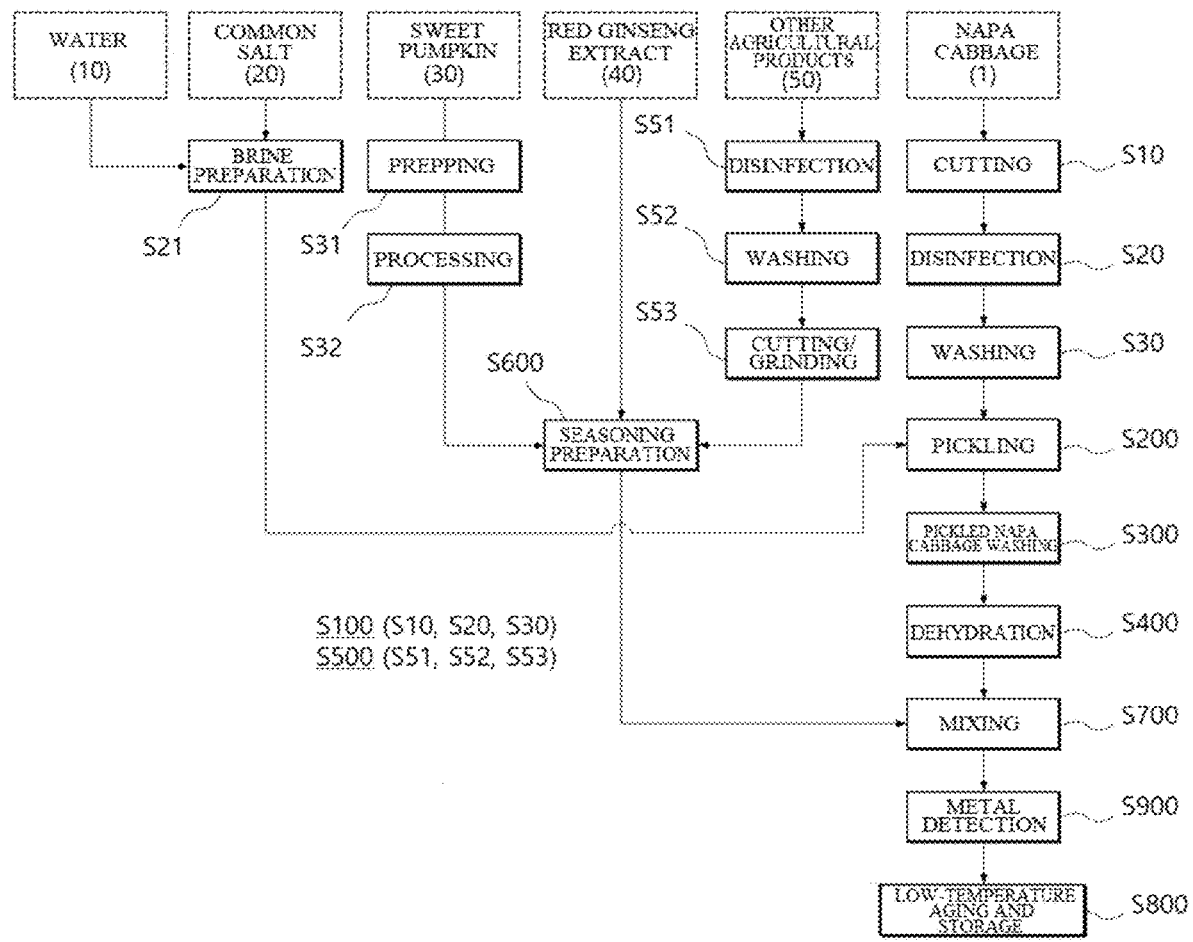

FIGS. 1 and 2 are diagrams illustrating a method of preparing vegetarian kimchi according to an embodiment of the present invention.

Referring to FIG. 1, the method of preparing the vegetarian kimchi according to the embodiment of the present invention may include an operation S100 of prepping napa cabbage, an operation S200 of pickling the napa cabbage, an operation S300 of washing the napa cabbage, an operation S400 of dehydrating the napa cabbage, an operation S500 of prepping ingredients of seasoning, an operation S600 of preparing the seasoning, an operation S700 of mixing and applying the seasoning to the napa cabbage, and an operation S800 of aging and storing the vegetarian kimchi at low temperature.

Referring to FIG. 2, in the method of preparing the vegetarian kimchi according to the embodiment of the present invention, water, common salt, sweet pumpkin, red *ginseng* extract, other agricultural products, and napa cabbage may be used for preparing the vegetarian kimchi.

Hereinafter, the method of preparing the vegetarian kimchi according to the embodiment of the present invention will be described with reference to FIGS. 1 and 2.

An operation S21 of preparing brine is an operation of preparing brine by mixing water 10 and common salt 20. The water 10 is limited to potable water according to the water quality inspection report of the waterworks office. The common salt 20 may include at least one of refined salt (Korean traditional salt), sawmill salt (flower salt), and sea salt. The brine may be prepared in a brine tank. The water 10 and the common salt 20 may be introduced into the brine tank. The brine may have a salinity of 9 to 13%. For example, water of 2,560 L and refined salt (Korean traditional salt) of 320 kg may be mixed so that a salinity of the brine may be 12%. For example, water of 1,920 L and refined salt (Korean traditional salt) of 240 kg may be mixed so that a salinity of brine may be 12%. The brine tank may be provided with a salinity meter.

The operation S100 of prepping the napa cabbage includes an operation S10 of selecting and cutting stored napa cabbage 1, an operation S20 of sorting and disinfecting the napa cabbage 1, and an operation S30 of washing the napa cabbage 1.

The napa cabbage 1 may be selectively purchased, brought in, and stored according to preset criteria for each period. The napa cabbage 1 may be stored in a refrigerated warehouse and maintained at an appropriate temperature so as to be stored in the freshest state. The napa cabbage 1 may be stored in an environment of 5° C. or less.

The operation S10 of selecting and cutting the napa cabbage 1 is an operation of dividing the napa cabbage 1 into sizes suitable for preparing the kimchi. After outer leaves and a root of the napa cabbage 1 are removed, the napa cabbage 1 may be cut into bite-sized pieces. The napa cabbage 1 may be cut into halves or quarters. When the napa cabbage 1 is cut, decaying parts, degraded parts, and inedible parts of the napa cabbage 1 may be removed. A knife used for removing the decaying parts, the degraded parts, and the inedible parts may be sterilized with an ultraviolet sterilizer.

A selection operation may be performed before the operation S10 of selecting and cutting the napa cabbage 1 is performed. That is, for the most delicious kimchi in each season, the napa cabbage 1 is selected and used. The napa cabbage 1, which has with dark green outer leaves and yellow inner leaves when cut, may be selected. Further, the napa cabbage 1 with a firm feel when held and pressed with both hands may be selected.

The operation S20 of sorting and disinfecting the napa cabbage 1 is an operation of disinfecting the cut napa cabbage 1. This operation may be omitted. The disinfection may be accomplished by an air washer and a chlorine (sodium hypochlorite) injector. When disinfecting with chlorine, a chlorine concentration may range from 50 to 100 ppm. A water temperature may be maintained at 10° C. or lower.

Between the operation S10 of selecting and cutting the napa cabbage 1 and the operation S20 of sorting and disinfecting the napa cabbage 1, foreign substances may be removed from the napa cabbage by vibration. In addition, in this process, according to preset criteria, when there is a non-standard part, only the non-standard part is removed or napa cabbage having a non-standard part may be excluded from the preparing of the kimchi.

The operation S30 of washing the napa cabbage 1 may be performed by an air washer. The water temperature of washing water may be maintained at 10° C. or lower.

Simultaneously with the operation S10 of selecting and cutting the napa cabbage 1 or after the operation S30 of washing the napa cabbage 1, a first sorting process may be performed to remove foreign substances, debris, insects, non-standard parts, and inedible parts.

The washed (or washed and then selected) napa cabbage may be provided to the operation S200 of pickling the napa cabbage.

The operation S200 of pickling the napa cabbage is an operation of pickling the napa cabbage using brine and/or common salt.

In the case of using brine, the brine may be prepared in the operation S21. The pickling of the napa cabbage is done in a pickling container and the napa cabbage and the brine are introduced into the pickling container. In the operation S200 of pickling the napa cabbage, additional common salt may be introduced. The additional common salt may be the same as the common salt 20 described above. The additional common salt may be sprinkled directly on the napa cabbage. The additional common salt may be added over the napa cabbage using an input machine so as to be sprinkled evenly.

An added amount of additional common salt may range from 3.5 to 6.0% of an amount of napa cabbage. The added amount of additional common salt may range from 8 to 11 kg. The napa cabbage may be loaded into the pickling container and each napa cabbage may be salted. When the napa cabbage is loaded up to the top of the pickling container, a press plate and a press container may be placed on the napa cabbage. The operation S200 of pickling the napa cabbage may be performed for four to seven hours. The operation S200 may take four to seven hours after the press plate and the press container are placed.

In the case of using only common salt without using brine, the common salt 20 described above may be sprinkled directly on the napa cabbage. The common salt may be sprinkled over the napa cabbage using an input machine so as to be sprinkled evenly.

An added amount of common salt may range from 3.5 to 6.0% of an amount of napa cabbage. The added amount of common salt may range from 8 to 11 kg. The napa cabbage may be loaded into the pickling container and each napa cabbage may be salted. When the napa cabbage is loaded up to the top of the pickling container, a press plate and a press container may be placed on the napa cabbage. The operation S200 of pickling the napa cabbage may be performed for four to seven hours. The operation S200 may take four to seven hours after the press plate and the press container are placed.

Meanwhile, the common salt or the additional common salt may be selected and used as clean salt.

The operation S300 of washing the pickled napa cabbage is an operation of washing the napa cabbage to remove some salt from the pickled napa cabbage. A washing time may range from one to two minutes. An amount of washing water may be 50 L/min or more. 25 L washing water may be used for each bunch of napa cabbage. An input amount of napa cabbage may be 50 kg/min or less. The washing water may be replaced every three hours. The water temperature may be maintained at 10° C. or lower. After the washing is performed, the napa cabbage may have a salinity of 2.8±0.2%.

After the operation S300 of washing the pickled napa cabbage is performed, a second sorting process may be performed in which parts that are not removed from the first sorting process, such as foreign substances, debris, non-standard parts, non-inedible parts, and green leaves, are sorted out.

The operation S400 of dehydrating the washed napa cabbage is an operation of removing water from the napa cabbage. The dehydration of the napa cabbage may be performed by a dehydration container. The napa cabbage containing moisture may be accommodated in the dehydration container and dehydrated naturally. For example, the napa cabbage may be loaded into the dehydration container and the water may be drained from the napa cabbage over time. The napa cabbage loaded into the dehydration container may be pressurized. A pressing tool may be used for pressing. A dehydration time may range from two to twelve hours. For example, the dehydration time may be twelve hours. Accordingly, as much as 70% of the moisture of the napa cabbage may be removed.

Ingredients of the seasoning may include sweet pumpkin 30, red ginseng extract 40, and other agricultural products 50, and the other agricultural products 50 may include onion, radish, garlic, leek, and ginger. The ingredients of the seasoning may further include additives such as fructose, sugar (e.g., white sugar), lactic acid, and a D-sorbitol solution. The ingredients of the seasoning may further include fruits such as apples, pears, and the like. The ingredients of the seasoning may further include glutinous rice paste.

In order to prepare the seasoning, the ingredients for the seasoning should be prepped first.

The operation S500 of prepping the ingredients of the seasoning may include an operation S31 of prepping sweet pumpkin, an operation S32 of processing the sweet pumpkin, and an operation S500 of prepping other agricultural products.

The operation S31 of prepping the sweet pumpkin may include an operation of washing the sweet pumpkin. The operation S31 of prepping the sweet pumpkin may include an operation of cutting the sweet pumpkin. The operation S31 may further include an operation of removing skin of the sweet pumpkin as necessary.

The operation S32 of processing the sweet pumpkin may include at least one of a process (i) of steaming or boiling the sweet pumpkin, a process (ii) of steaming or boiling and mashing the sweet pumpkin, a process (iii) of steaming or boiling and grinding the sweet pumpkin, a process (iv) of cutting the sweet pumpkin into thin strips, and a process (v) of grinding the sweet pumpkin into powder.

The process (i) of steaming or boiling the sweet pumpkin is a process in which the prepped sweet pumpkin is placed above boiling water to steam the sweet pumpkin or the sweet pumpkin is put directly into water and the sweet pumpkin is boiled so that the sweet pumpkin becomes soft.

The process (ii) of steaming or boiling and mashing the sweet pumpkin is a process in which the sweet pumpkin is steamed or boiled as in process (i) and then is pressurized and mashed.

The process (iii) of steaming or boiling and grinding the sweet pumpkin is a process in which the sweet pumpkin is steamed or boiled as in process (i) and then is ground using a blender or the like, and the sweet pumpkin may be ground while adding water as necessary. In this case, an amount of water to be added may vary according to the desired viscosity.

The process (iv) of cutting the sweet pumpkin into thin strips is a process in which the sweet pumpkin is cut into small pieces. Instead of using steamed or boiled sweet pumpkin, raw sweet pumpkin may be cut and may be used as seasoning without processing.

The process (v) of grinding the sweet pumpkin into powder is a process in which the sweet pumpkin is dried and then made into small particles. Raw sweet pumpkin or steamed or boiled sweet pumpkin may be dried and then ground. For the drying, freeze-drying or natural drying may be used.

The operation S500 of prepping the other agricultural products is an operation of prepping garlic, ginger, onion, radish, and leek. The other agricultural products 50 may be stored in an environment of 5° C. or less. The other agricultural products 50 may go through a selection process in which decaying parts, degraded parts, and inedible parts are removed. A knife used in the selection process may be sterilized with an ultraviolet sterilizer.

The operation S500 of prepping the other agricultural products may include a disinfection operation S51, a washing operation S52, and a cutting/grinding operation S53 of the other agricultural products 50.

The disinfection operation S51 may be performed on the garlic and the ginger among the other agricultural products. The disinfection operation S51 may be performed by an air washer and a chlorine (sodium hypochlorite) injector. When disinfecting with chlorine, a chlorine concentration may be 200 ppm. The water temperature may be maintained at 11° C. or lower. A disinfection time may be five minutes. The disinfected garlic and the ginger may be washed twice or more under running water so that residual chlorine may be removed.

The washing operation S52 is an operation of washing the onion, the radish, and the leek, including the disinfected garlic and the ginger, with water. An input amount of the agricultural products, that is, an input amount of garlic, ginger, onion, and radish may be 20 kg/min or less and an input amount of leek may be 3 kg/min or less. An amount of washing water may be 15 L/min or more, a washing time may be one minute or more, and the washing water may be replaced every time an ingredient of the agricultural products is changed.

The cutting/grinding operation S53 is an operation of cutting and grinding the washed agricultural products to a predetermined size. In this operation, a cutter and a grinder may be used.

Meanwhile, the red *ginseng* extract 40 may be prepared by decocting red *ginseng* in water for a long time. For example, the red *ginseng* extract 40 may be firstly extracted by boiling washed red *ginseng* in water and decocting the red *ginseng* until the water becomes ⅔, and then may be secondly extracted by re-boiling and decocting the cooled red *ginseng* liquid with less water added than in the first extraction. Alternatively, the red *ginseng* extract 40 may be prepared by steaming the washed red *ginseng* in a steamer and then decocting and filtering. In addition, the red *ginseng* extract 40 may be prepared in various ways.

The operation S600 of preparing the seasoning is an operation of mixing the prepared sweet pumpkin, the red *ginseng* extract, and the cut/ground other agricultural products according to the amount of a mixing ratio. As described above, additives such as fructose, sugar, lactic acid, a D-sorbitol solution, and the like and fruits such as apples, pears, and the like may be further mixed. The ingredients of the seasoning may further include the glutinous rice paste.

The seasoning in which the ingredients are mixed may be aged. An aging and storage temperature may range from 0 to 10° C. and an aging time may be 24 hours or more. The operation S700 of mixing and applying the seasoning to the napa cabbage is an operation of mixing and applying the aged seasoning to the dehydrated napa cabbage. A mixing (applying) time may range from 70 to 100 seconds. After the mixing is performed, the kimchi may have a salinity of 2.3±0.2%, sugar content of 12±1%, and pH of 5.0±0.2.

The operation S800 of aging and storing the kimchi at low temperature is an operation of aging and storing the kimchi at low temperature in a packed or unpacked state. The kimchi in the packed state may be packed with a packing material such as a polyethylene terephthalate (PET) container or a bottle. The kimchi in the unpacked state may be accommodated in a storage container. The storage container may be sealed or open. The kimchi may be aged and stored in a low-temperature warehouse and may be aged and stored at −2° C. for three months.

The method of preparing the vegetarian kimchi may further include, before the operation S800 of aging and storing the kimchi at low temperature, an operation S900 of detecting a metal.

The operation S900 of detecting the metal is an operation of detecting the metal in the mixed and prepared kimchi. For example, a metal such as Fe, stainless use steel (SUS), or the like may be detected. Fe of 3 mm or more should not be detected and SUS of 4 mm or more should not be detected, but criteria thereof are not limited thereto.

As specific criteria, in the case of a product of 1 kg or more being packed in a PET container or a bottle, Fe of 3.0 mm or more should not be detected and SUS of 5.0 mm or more should not be detected. In the case of a product of less than 1 kg being packed in the PET container or the bottle, Fe of 3.0 mm or more should not be detected and SUS of 4.0 mm or more should not be detected. In the case of a product being packed in a container other than the PET container and the bottle, Fe of 4.8 mm or more should not be detected and SUS of 6.0 mm or more should not be detected.

Meanwhile, the PET- or bottle-packed product may be subjected to the operation of detecting the metal after performing inner packing and measurement and then outer packing. In the case of the product being packed in the container other than the PET container and the bottle, inner packing and outer packing may be made after the operation of detecting the metal is performed. A label containing product information may be affixed to wrapping paper.

The operation S900 of detecting the metal may be performed by a method of passing the kimchi through a metal detector while moving the kimchi on a conveyor. When a detection signal is generated, the corresponding kimchi may re-pass therethrough, and when the metal is detected even in the case in which the kimchi re-passes therethrough, the corresponding kimchi may be excluded or managed separately.

The mixing ratio of the vegetarian kimchi according to the embodiment of the present invention may be as follows.

napa cabbage (98.3% napa cabbage, 1.7% common salt): 70 to 76 weight %,
sweet pumpkin: 1 to 4 weight %,
red *ginseng* extract: 0.1 to 0.5 weight %,
onion: 9 to 11 weight %,
radish: 3 to 6 weight %,
garlic: 1 to 3 weight %,
leek: 0.5 to 1.5 weight %,
ginger: 0.1 to 1 weight %,
glutinous rice paste (10% glutinous rice, 90% purified water): 0.5 to 1.5 weight %,
white sugar: 0.1 to 1 weight %,
fructose: 0.1 to 1 weight %,
lactic acid: 0.001 to 0.1 weight %,
D-sorbitol solution: 1 to 3 weight %, and
common salt: 0.1 to 1 weight %.

A specific mixing ratio of the vegetarian kimchi may be as follows.

napa cabbage (98.3% napa cabbage, 1.7% common salt): 74.38 weight %,
sweet pumpkin: 2.39 weight %,
red *ginseng* extract: 0.18 weight %,
onion: 10.17 weight %,
radish: 4.35 weight %,
garlic: 1.83 weight %,
leek: 1.04 weight %,
ginger: 0.39 weight %,
glutinous rice paste (10% glutinous rice, 90% purified water): 1.09 weight %,
white sugar: 0.61 weight %,
fructose: 0.12 weight %,
lactic acid: 0.09 weight %,
D-sorbitol solution: 1.97 weight %, and
common salt: 0.64 weight %.

The vegetarian kimchi according to the embodiment of the present invention which contains the above-described ingredients is inspired by baek-kimchi excluding the spicy taste of the red pepper powder and the taste of the salted seafood and is immune-enhancing vegetarian kimchi with a delicious yellow color flavored with sweet pumpkin rich in beta-carotene and red *ginseng* extract that aids in improving immunity. The above vegetarian kimchi may also be consumed as a substitute for salad.

Figure 3:
FIG. 3 is a photograph showing an actual appearance of the vegetarian kimchi according to the embodiment of the present invention.

FIG. 3 is a photograph showing an actual appearance of the vegetarian kimchi according to the embodiment of the present invention. As illustrated in FIG. 3, the vegetarian kimchi according to the embodiment of the present invention is yellow.

[Table 1] below shows results of a sensory test that is performed on the vegetarian kimchi prepared with the above specific mixing ratio. [Table 1] below shows results of comparing vegetarian kimchi A according to the embodiment of the present invention to general kimchi B, C, and D containing red pepper powder.

As a result of the sensory test, it can be seen that the vegetarian kimchi according to the embodiment of the present invention has a high preference in terms of color and flavor compared to the general kimchi containing the red pepper powder.

Conditions of the sensory test are as follows.
Number of test subjects: 30
A case of eating only vegetarian kimchi
Score: 1 to 5 (1: very poor, 2: poor, 3: average, 4: good, 5: very good)

TABLE 1

| Items | Color | Taste | Flavor | Texture | Preference |
|---|---|---|---|---|---|
| A | 4.9 | 4.8 | 4.9 | 4.8 | 4.8 |
| B | 4.5 | 4.5 | 4.5 | 4.6 | 4.6 |
| C | 4.7 | 4.5 | 4.4 | 4.8 | 4.5 |
| D | 4.6 | 4.6 | 4.7 | 4.6 | 4.6 |

[Table 2] below shows results of a sensory test that is performed on the vegetarian kimchi prepared with the above specific mixing ratio in a case in which a low-temperature aging storage temperature and a storage period are set differently.
As a result of the sensory test, it can be seen that the preference is the highest when the vegetarian kimchi is aged at −2° C. for three months at low temperature.

Conditions of the sensory test are as follows.
Number of test subjects: 30
A case of eating only vegetarian kimchi or a case of eating vegetarian kimchi with other foods
Score: 1 to 5 (1: very poor, 2: poor, 3: average, 4: good, 5: very good)

TABLE 2

| Conditions | | Example | Comparative Example 1 | Comparative Example 2 | Comparative Example 3 | Comparative Example 4 |
|---|---|---|---|---|---|---|
| Aging temperature | | −2° C. | 0° C. | −5° C. | −2° C. | −2° C. |
| Aging time | | 3 months | 3 months | 3 months | 1 month | 6 months |
| Sensory test | Color | 4.9 | 4.5 | 4.5 | 4.3 | 4.5 |
| | Taste | 4.8 | 4.5 | 4.6 | 4.5 | 4.6 |
| | Flavor | 4.9 | 4.4 | 4.4 | 4.6 | 4.6 |
| | Texture | 4.8 | 4.6 | 4.2 | 4.2 | 4.5 |
| | Preference | 4.8 | 4.5 | 4.5 | 4.4 | 4.5 |

[Table 3] below shows results of a sensory test that is performed on the vegetarian kimchi according to the embodiment of the present invention in a case in which the content of the sweet pumpkin and the content of the red ginseng extract are set differently.
As a result of the sensory test, it can be seen that, when the amount of red ginseng extract is too large compared to the amount of sweet pumpkin, the preference is lowered in terms of flavor and taste, and when the amount of sweet pumpkin is too little (there is no sweet pumpkin) or too much, the preference is lowered in terms of color.

Conditions of the sensory test are as follows.
Number of test subjects: 30
A case of eating only vegetarian kimchi
Score: 1 to 5 (1: very poor, 2: poor, 3: average, 4: good, 5: very good)

TABLE 3

| Conditions (weight %) | | Example | Comparative Example 1 | Comparative Example 2 | Comparative Example 3 | Comparative Example 4 |
|---|---|---|---|---|---|---|
| Sweet pumpkin | | 2.39 | 0 | 5.31 | 2.39 | 2.39 |
| Red ginseng extract | | 0.18 | 0.18 | 0.18 | 0 | 1.45 |
| Sensory test | Color | 4.9 | 4.2 | 4.2 | 4.6 | 4.5 |
| | Taste | 4.8 | 4.4 | 4.5 | 4.5 | 4.4 |
| | Flavor | 4.9 | 4.3 | 4.4 | 4.6 | 4.2 |
| | Texture | 4.8 | 4.6 | 4.2 | 4.6 | 4.5 |
| | Preference | 4.8 | 4.5 | 4.5 | 4.5 | 4.4 |

According to the vegetarian kimchi and the method of preparing the same according to the present invention, the prepared vegetarian kimchi can have a yellowish color and have high nutritional value.

Meanwhile, even when it is an effect not explicitly described herein, it is added that the effects described in the following specification expected by the technical features of the present invention and their potential effects are treated as described in the specification of the present invention.

The protection scope of the present invention is not limited to the description and expression of the embodiments explicitly described above. In addition, it is added once again that the protection scope of the present invention cannot be limited due to obvious changes or substitutions in the art to which the present invention pertains.

What is claimed is:

1. A method of preparing vegetarian kimchi, the method comprising:

cutting and washing napa cabbage;

disinfecting the cut and washed napa cabbage with chlorine disinfectant, wherein a chlorine concentration of the chlorine disinfectant ranges from 50 to 100 ppm;

pickling the disinfected napa cabbage using salt for four to seven hours, wherein the salt includes at least one of refined salt, sawmill salt, and sea salt and is 3.5 to 6.0 weight % of the napa cabbage, and wherein the pickling occurs in a pickling container using a press plate and a press container placed on the napa cabbage;

washing the pickled napa cabbage;

dehydrating the pickled napa cabbage that is washed in a pressurized dehydration container for two to twelve hours so that 70% of the moisture of the pickled napa cabbage is removed;

preparing seasoning including sweet pumpkin, red *ginseng* extract, onion, radish, garlic, glutinous rice paste, leek, sugar, and ginger;

combining the dehydrated napa cabbage and the seasoning to prepare the vegetarian kimchi;

detecting a metal in the vegetarian kimchi; and aging and storing the vegetarian kimchi at −2° C. for 3 months, wherein the preparing of the seasoning comprises:

preparing agricultural products including the garlic, the ginger, the onion, the radish, and the leek;

disinfecting the garlic and the ginger;

washing the agricultural products;

cutting and grinding the agricultural products;

mixing the sweet pumpkin, the red *ginseng* extract, the agricultural products, and the glutinous rice paste to prepare the seasoning; and aging the mixed seasoning for 24 hours or more at a temperature of 0 to 10° C., wherein the vegetarian kimchi consists of 2.39 weight % sweet pumpkin, 0.18 weight % red *ginseng* extract, 10.17 weight % onion, 4.35 weight % radish, 1.83 weight % garlic, 1.04 weight % leek, 0.39 weight % ginger, 1.09 weight % glutinous rice paste, 0.61 weight % white sugar, 0.12 weight % fructose, 0.09 weight % lactic acid, 1.97 weight % D-sorbitol solution, 0.64 weight % salt, and the dehydrated pickled napa cabbage as remainder, and wherein the vegetarian kimchi after the combining has a salinity of 2.3±0.2%, sugar content of 12±1%, and pH of 5.0±0.2.

2. The method of claim 1, wherein:

the garlic and the ginger are disinfected for five minutes using a chlorine disinfectant having a chlorine concentration of 200 ppm at a temperature of 11° C. or lower.

* * * * *